Patented Nov. 17, 1942

2,301,983

UNITED STATES PATENT OFFICE 2,301,983

COATED FERROUS ARTICLE AND METHOD OF MAKING

Robert R. Tanner, Detroit, Mich., assignor to Parker Rust Proof Company, Detroit, Mich.

No Drawing. Application July 16, 1940, Serial No. 345,799

26 Claims. (Cl. 148—6.5)

This invention relates to the treatment of metallic and especially ferrous surfaces to improve the adhesion of siccative coatings, such as paint, enamel, lacquers, and the like thereto. It also relates to increasing the bare corrosion resistance of metals.

A number of metal treating processes are known that make use of solutions which react with metal surfaces and produce insoluble paint holding and protective coatings. Among the better known are those that produce phosphate or oxalate coatings. Such methods ordinarily require subjecting the metal, either by spraying it or by immersion, to a solution of proper chemicals for a sufficient length of time to form the desired coating. The excess processing solution is then removed from the coating by washing with water before paint is applied.

The prfesent invention has as an object the use of a new type of aqueous solution which may be applied to the metal as a film and when dried in situ provides a coating which serves as an excellent paint base and increases the corrosion resistance of the metal.

This is accomplished by employing a solution containing pentavalent arsenic and hexavalent chromium, the solution being applied to the metal in any convenient manner and either dried at atmospheric temperature or by baking, so that the film becomes a part of the article.

According to the present invention, the plating out of arsenic, if it occurs at all, is secondary, and in a number of modifications of the invention there is no evidence that there is any such plating out occurring, at least to a visible extent, the superior results apparently being due to the drying upon the surface the solution containing the pentavalent arsenic and hexavalent chromium.

The following examples are given to illustrate the invention, but it is understood that these are only for illustrative purposes and not with the intention of limiting the scope of the invention to the specific ingredients, proportions, or other specific conditions set forth.

Example #1.—A 9% solution of chromic acid was prepared and in separate portions arsenic pentoxide was dissolved in amounts equivalent to .2, .5, 1.0, 2.0, 5.0, 10.0, and 20.0% of the solutions. 1% of a wetting agent was added to each of these and the solutions then applied by means of a spray gun to different steel panels, after which some were air dried, some baked for 4 minutes at 300° F., and others baked 4 minutes at 500° F.

The treated panels were painted and tested in salt spray and compared with painted but untreated control panels. In all cases, results decidedly superior to the controls were obtained in corrosion resistance and paint adhesion. The improvement became more pronounced with increasing amounts of the pentoxide dissolved.

Example #2.—Arsenic trioxide may also be used instead of the pentoxide since it will at once be oxidized by the chromic acid and form arsenic acid. In this case, however, an increased amount of chromic acid has to be used to produce a solution having a pre-selected amount of the acid after the oxide has been dissolved. If the trioxide is used, some trivalent chromium will result in the solution. This appears to be an advantage rather than otherwise since the trivalent chromium seems to improve the resistance of applied films of paint to "blistering" or losing adhesion in small areas especially when exposed to humid conditions without decreasing the resistance to corrosive atmosphere.

By way of specific example, arsenic trioxide was dissolved in chromic acid in solutions of sufficient concentration so that after the dissolving of the oxide was complete there was approximately 9% of chromic acid left in each case. Amounts of the trioxide used were 1.0, 2.0, 5.0, and 10.0%. These different solutions were applied to steel panels by spraying and then baked 10 minutes at 550° F.

It will be noted in the previous examples that the amount of arsenic in solution varies considerably. In spite of this, in none of the cases was there any visible plating out of metallic arsenic.

The examples show the presence of a wetting agent. This serves to provide a uniform wetting of the metallic surface, which is necessary for best results. Chromic acid is of an oily nature and tends to creep away from edges and perforations, and the increased wetting ability eliminates this tendency.

Since chromic acid is a strong oxidizing agent, the wetting agents employed must be selected with some care, or their usefulness will be lessened, since they may be decomposed. It has been found that the Duponols and Gardinols (trade names) are quite stable. Substantially pure forms should be used to guard against possible injury to subsequently applied paint finishes. The base of these agents is sodium lauryl sulphate. Certain free sulfonic acids, such as Novonacco NN (trade name) may also be used, but are generally better adapted to solutions having low chromic acid concentrations.

Tertiary butyl alcohol may also be used with the smaller amounts of chromic acid since it is oxidized relatively slowly.

Dichromates may be used in the preceding examples as well as those that follow in conjunction with the chromic acid, or in place of it. Among the dichromates which may be used are those of aluminum, zinc, ferric iron, magnesium, ammonium, chromium, nickel, cobalt, cadmium, copper, manganese, and calcium, which are mentioned by way of example, and not as a complete list of those which may be used. Other dichromates, and where desired, other metals, whether or not they form dichromates, may be added to the solution. The oily nature of the solution is considerably reduced by the presence of dissolved metal and it is possible in some instances to dispense entirely with the use of wetting agents. The hygroscopic nature of the solution is also lessened, making it possible to air dry higher concentrations of the solutions, or employ lower baking temperatures for shorter times with the more concentrated solutions. The metal may be dissolved in chromic acid as oxide or carbonate for example, then mixed with the pentavalent arsenic, since the trivalent chromium formed does no harm; or a previously prepared dichromate may be used.

The following examples are illustrative of the invention where use is made of dichromates and pentavalent arsenic in varying proportions in solutions which may be air dried or baked at low temperatures.

Example #3

| | Per cent |
|---|---|
| Zinc dichromate | 1.5 |
| Arsenic pentoxide | 4.0 |
| Duponol wetting agent | .5 |

Example #4

| | Per cent |
|---|---|
| Ammonium dichromate | 4.0 |
| Arsenic pentoxide | 4.0 |
| Duponol wetting agent | .5 |

Example #5

| | Per cent |
|---|---|
| Aluminum dichromate | 4.0 |
| Arsenic pentoxide | 4.0 |
| Duponol wetting agent | .5 |

The other metals previously mentioned may, of course, be substituted in these formulas.

The solutions may contain chromic acid over and above that required to form the dichromate. Both the concentrations and proportions of the ingredients may be varied widely.

If soluble arsenates, either the normal or acid, are substituted for the oxide, it is advisable to have present a small amount of chromic acid over that which may come from the dichromate in order to obtain proper adhesion to the metal. Too low a free acid may result in a coating of inferior corrosion resistance or paint adhesion.

Where ample baking facilities are available, it will be advantageous to use higher concentrations of the chemicals because the excellence of the results appears to be generally related to the concentrations employed. Amounts of either the dichromate, pentavalent arsenic compound, or both, may be used as high as 15 or 20%, but these formulas require baking at relatively high temperatures up to 500 and 600° F. for several minutes to render them sufficiently insoluble or non-hygroscopic.

In general, it is preferable to dry or bake the film of the solution until it is no longer hygroscopic and is modified so that it is no longer soluble in the original solution, but sometimes, when paint or other protective material is to be applied immediately, this degree of drying is not necessary.

Good wetting of the metal may be obtained by preheating it immediately before the solution is applied. This has the effect of "setting" the solution as it contacts the metal surface so that there is no opportunity for it to creep. The preheating step is especially applicable where the solution is sprayed or brushed on or otherwise applied as a film. If the preheated metal is dipped into a volume of the solution in order to coat it, the cooling influence of the bath reduces the effectiveness of the preheating. If, however, it is advantageous to dip the objects, the solution itself may be heated to facilitate drying of the work upon removal.

If a large volume of production is to be treated, it may be done by spraying the articles as they move along on a conveyor past a series of spray nozzles, the excess solution being collected, recirculated, and re-sprayed. Under these conditions it is preferable to avoid the use of wetting agents in the solution since the agitation causes them to foam excessively and loss of solution may result. Other means than wetting agents may be utilized for obtaining uniform films of the solutions. These may include a pretreatment which forms on the surface, material with which the acid arsenic-chromium solution reacts more rapidly than with the metal surface, or which renders the metal itself more active, or a chemical may be introduced into the acid arsenic-chromium solution which renders it more reactive with the surface to which it is applied.

If there is added to the pentavalent arsenic-hexavalent chromium solution a free mineral acid, or an acid producing salt, such as zinc nitrate, which hydrolyzes to produce a small amount of nitric acid, there appears to be a slight reaction with the metal surface in spite of the inhibiting action of the other chemicals, and the solution spreads uniformly over the surface and in intimate contact with the metal, thus reducing creepage to a minimum.

The acid, or acid producing salt, must be one which will not be deleterious to any paint finish that may be used. For example, chlorides will cause blistering and will also tend to destroy the inhibiting action of the hexavalent chromium. Phosphoric acid, or dihydrogen phosphates that hydrolyze to give free acid, may be used for the purpose of obtaining satisfactory wetting. They also may be used to furnish the metal constituent to the solution in place of the oxide or carbonate, since the phosphate is not harmful. In fact, phosphate-containing solutions have been used in a variety of ways to increase both corrosion resistance and paint adhesion of metallic surfaces.

*Example #6.*—In other tests which have been run according to the present invention, mixtures containing hexavalent chromium and pentavalent arsenic, and phosphate in addition, have been found to give excellent results. Ferrous sheets preheated to 150 or 300° F. and treated with solutions containing 10% phosphoric acid, 1 to 10% arsenic pentoxide, and 5% chromic acid, then baked for 10 minutes at 550° F. had very good corrosion resistance when the sheets were exposed bare to the atmosphere, as well as having good paint adhesion.

The solutions containing the arsenic and chromium may be applied over other chemically produced coatings to increase their resistance and paint-holding properties as well as to facilitate wetting and this is the preferred form of the invention. Any coating that is not attacked to such an extent as to render the whole non-adherent and therefore unsuitable, may be successfully treated with the mixtures of the present invention. Usually it is desirable that the first coating should react to some extent with the acid arsenic-chromium solution, and where this takes place the results of such reaction should be taken into account in compounding the solution. In some instances, the first treatment may not leave any appreciable, or even visible, coating and still may render the surface of the metal more reactive with the acid arsenic-chromium solution.

Not only are unusually good corrosion resistant and paint holding coatings produced by applying the solution over preformed coatings, but excellent wetting and uniformity are obtained with the applied films without the use of wetting agents. Aside from the chemically reactive feature, practically any chemically formed coating, such as phosphate, oxalate, oxide, and others produced by a large variety of organic acids, have a more porous, absorbent nature than a bare metal surface, and for this reason also aid in wetting.

One excellent way of increasing both the desired corrosion resistance and obtaining adequate wetting of the solutions of the present invention is by pretreating the metal with certain solutions that contain an acid and a metal compound, the metal of which will constitute a part of a coating formed on the surface. Generally, an oxidizing agent is desirable. The following examples are given to illustrate the manner in which the chemical pretreating and final steps may be carried out as applied to ferrous surfaces.

*Example #7.*—The metal surface is first cleaned, if necessary, in any suitable manner, of oil, grease, and other foreign matter by suitable means which may be alkali cleaning, wiping with an oil solvent, vapor degreasing, pickling, and so forth. It is then subjected for 30 seconds to a solution of the following composition at room temperature.

| | Per cent |
|---|---|
| $H_2O$ | 93.00 |
| $H_3PO_4$ | 5.00 |
| $NaClO_3$ | .25 |
| $As_2O_5$ | .25 |
| Ferric iron | 1.00 |
| Cl as NaCl | .5 |

There is then applied to the treated surface a solution of the following composition:

| | Per cent |
|---|---|
| Arsenic pentoxide | 6.0 |
| Chromic acid | 3.0 |
| Trivalent chromium | .5 |

The treated article is then baked 10 minutes at 550° F.

It is an essential part of the invention that a film of the solution used in the second step remain as a permanent part of the treated article.

A ferrous article treated as described affords an excellent paint base and will also withstand considerable prolonged exposure to corrosive atmosphere without the formation of rust.

Such a procedure is well adapted to the treatment of steel before fabrication because the coated metal can stand temper rolling, drawing, welding, and cleaning by any of the well known methods, without entirely losing the benefits of the coating.

*Example #8.*—As a further example, a ferrous surface may be treated in accordance with the first step described above and thereafter treated with a solution of the following composition:

| | Per cent |
|---|---|
| Zinc dichromate | 12 |
| Arsenic pentoxide | 20 |
| Wetting agent | 1 |

The treated article is then baked for 10 minutes at 550° F.

A number of other solutions may be successfully employed in carrying out the first step of the invention. The following examples illustrate some of the variations. Each formula given is for 2000 cc. of water except when otherwise specified. The treatment is for thirty seconds at room temperature except where otherwise noted.

*Example #9*

| | | |
|---|---|---|
| Cobalt nitrate .6$H_2O$ | grams | 5 |
| 70% nitric acid | cc | 20 |

*Example #10*

| | | |
|---|---|---|
| Nickel carbonate | grams | 3 |
| 75% phosphoric acid | cc | 10 |

*Example #11*

| | | |
|---|---|---|
| Potassium antimony tartrate | grams | 15 |
| 70% nitric acid | cc | 100 |

*Example #12*

| | | |
|---|---|---|
| Stannous phosphate | grams | 5 |
| 70% nitric acid | cc | 50 |

*Example #13*

| | | |
|---|---|---|
| Mercuric nitrate | grams | 5 |
| 70% nitric acid | cc | 40 |
| Treating time | seconds | 5 |

*Example #14*

| | | |
|---|---|---|
| Lead nitrate | grams | 10 |
| 70% nitric acid | cc | 20 |
| Treating time | seconds | 5 |

*Example #15*

| | | |
|---|---|---|
| Molybdic oxide | gram | 1 |
| 75% phosphoric acid | cc | 20 |

*Example #16*

| | | |
|---|---|---|
| Bismuth nitrate .5$H_2O$ | grams | 5 |
| 70% nitric acid | cc | 20 |

*Example #17*

| | | |
|---|---|---|
| Titanium dioxide | grams | 2 |
| Sulfuric acid | cc | 15 |
| Nitric acid | cc | 10 |

*Example #18*

| | | |
|---|---|---|
| Thallium trichloride | grams | 2 |
| Sulfuric acid | cc | 10 |
| Nitric acid | cc | 5 |
| Treating temperature | degrees | 180 |

*Example #19*

| | | |
|---|---|---|
| Tungstic oxide | grams | 2 |
| Sulfuric acid | cc | 10 |
| Treating time | minute | 1 |
| Treating temperature | degrees | 200 |

Solutions containing other oxidizing agents than nitric acid are illustrated in the following examples:

Example #20

| | | |
|---|---|---|
| Water | cubic centimeters | 1000 |
| Concentrated sulfuric acid | cubic centimeters | 2 |
| Arsenic pentoxide | grams | 5 |
| Sodium chlorate | grams | 10 |

Example #21

| | | |
|---|---|---|
| Water | cubic centimeters | 1000 |
| Concentrated hydrochloric acid | cubic centimeters | 25 |
| Arsenic pentoxide | grams | 10 |
| Sodium chlorate | grams | 10 |

Example #22

| | | |
|---|---|---|
| Water | gallon | 1 |
| 75% phosphoric acid | cubic centimeters | 10 |
| Arsenic pentoxide | grams | 2 |
| 30% hydrogen peroxide | cubic centimeters | 15 |

Ferric iron may also be used as an oxidizing agent. It may either be added to the bath in the form of a suitable salt or the iron itself from the work and present in the solution in the ferrous form may be partially or entirely oxidized by a suitable oxidizing agent.

In such an instance, the oxidizing agent may be only ferric iron, or both the ferric iron and an excess of the other oxidizing agent may be present.

It is desirable in many cases to employ an oxidizing agent in the first step thus making it possible to obtain the desired results in a shorter time. Mixtures of oxidizing agents may be used if desired.

Other oxidizing agents which may be employed to advantage include perchlorates, permanganates, sulphites, persulphates, iodates, periodates, bromates, chromic acid, or other hexavalent compounds, peroxides, quinone, and ceric salts. When sulphite is used under conditions favorable for producing oxide coatings, there is usually sulphide in the coating also.

The metals which have given the most advantageous results appear to be arsenic, bismuth, antimony, magnesium, aluminum, zinc, manganese, molybdenum, lead, and tin, and these are the preferred metals.

The application of the first step of the described process permits of considerable variation. The solution may be applied in any convenient way, such as by immersing the metal therein, or the solution may be sprayed upon the metal, or may be applied by means of a brush. The temperatures at which the solution may be applied can vary from room temperature up to boiling, somewhat longer times being required at the lower temperatures.

In some instances, the first treatment may comprise applying a film of an acid and drying some of the acid on the surface along with products of its reaction. For example, a film of arsenic acid solution may be applied first and may be dried partially, if desired, then a solution of chromic acid or a dichromate may be applied thereover and dried. Of course, this preliminary treatment may also be employed where pentavalent arsenic is used in the second solution.

It has been found that while good results are obtainable without employing a rinse between the first and second steps of the process, there are cases in which the use of a rinse secures advantageous results, as, for example, when the first solution makes use of hydrochloric acid or other materials which tend to cause blistering when a finish coat is applied to the treated article.

Where there is considerable chromic acid in the solution, most favorable conditions are necessary for satisfactory wetting. Better wetting is obtained either by reducing the proportionate amount of free chromic acid or by diluting the solution and so reducing the percentage of chromic acid. Where a solution relatively low in chromic acid is employed, less care is necessary to produce satsifactory wetting. In some cases, activating the surface by what amounts substantially to an incipient pickling action may secure sufficient wetting. The pretreatment of the metal surface to better condition it for receiving a solution containing hexavalent chromium and having a tendency to creep is disclosed and claimed in a co-pending application of John S. Thompson for Coated ferrous article and method of making the same, filed May 29, 1940, Serial No. 337,860, and is claimed herein only in connection with the drying on of a solution containing both pentavalent arsenic and hexavalent chromium.

Solutions according to the present invention are especially adapted to the treatment of ferrous sheets before fabrication. It is practically a universal requirement that any rust-proofing, paint-holding coating, which is applied to a pre-fabricated sheet, be capable of being welded and drawn. It is also necessary that such coatings be able to withstand a large variety of commercial cleaning methods without being seriously injured. Ferrous surfaces coated with oxalate or phosphate, although valuable for increasing the paint adhesion, cannot be readily welded as such coatings act as insulators. Neither can they be drawn to any extent without serious injury because of their crystalline nature. They are more or less soluble in even comparatively weak alkaline solutions such as found in commercial cleaners, and therefore may be seriously attacked. Coatings according to the present invention because of their different characteristics may be made to successfully fulfill all of these requirements.

If some steel is temper rolled so that it will meet the demands of a certain drawing operation and is then allowed to remain for some time in storage before the drawing operation takes place, it will be found that the physical characteristics of the steel have been changed and it may be necessary to re-temper the sheet. It is, therefore, a general practice in the steel plants to temper roll the sheet only a short time before it is shipped to the customer for use. It can, therefore, be seen that under these conditions any rustproofing coating which is applied to the unfabricated sheet at the steel mill should be capable of withstanding the temper rolling operation without seriously losing its value as a protective medium.

Moderately high temperatures will also change the physical properties of steel. When fairly large amounts of chromic acid are used, according to the present invention for treating steel sheets, it is necessary to bake these films at relatively high temperatures in the neighborhood of 500 to 600° F. This temperature is sufficient to change the properties of the steel. Therefore, it can be seen that in some instances it is necessary to temper roll the sheets after they have been treated. With dichromates or less amounts of chromic acid, lower drying temperatures are satisfactory. Time of baking is also an element to be considered.

Although solutions containing the pentavalent arsenic and hexavalent chromium are very rust-proof when applied to the metal surface directly, much better results are obtained after temper rolling in this respect if the sheet is first given a treatment with one of the pretreating solutions described. There apparently is some slight loss of the final coating due to the temper rolling operation, but the treatment with the first solution seems to substantially compensate for this loss where the first treatment itself produces a corrosion retarding coat. When properly applied, the dried arsenic-chromium film is of a somewhat glassy appearance and has more adhesion to the metal than cohesion so that it can crack and many of the particles still cling to the metal, especially where there is pretreatment. The use of the two treatments or steps is, therefore, the preferred form of the invention when treating prefabricated steel sheets.

The oil and drawing compounds used in forming or drawing the treated sheet must be removed before paint is applied. Alkali cleaners are most commonly used for this purpose. It has been found that if, after the use of such cleaners, the object is given a final rinse in chromatic acid, or a dichromate, preferably other than the alkali metal dichromates, decidedly superior results are derived because blistering of the applied paint is reduced to a minimum. The rinsing of the surface not only serves to neutralize any residual alkali from cleaning, but also reduces the ill effects from hardness inherent in the water. Amounts of chromic acid or dichromates as low as 2 grams per gallon are satisfactory.

Phosphoric acid may also be used for this purpose but is less desirable because especially lined tanks are necessary. However, a combination of chromic acid or dichromates and phosphoric acid may be used with complete satisfaction in steel tanks because the action of the prosphoric acid is then inhibited.

These final rinse solutions are permanently retained on the surface and are not rinsed off before painting the treated objects. All that is necessary is that they are dried sufficiently to remove the moisture.

During the bending and drawing operations where the stretch of the metal in certain areas is unusually severe, there may be an objectionable loss of the arsenic-chromium coating. Therefore, in order to have a surface which has a uniform paint adhesion, it may be necessary to treat these areas. This may be done with any one of a number of metal treating solutions because at this stage it is no longer necessary to employ a coating which can be welded or formed. The injured areas may be treated locally or the entire article may be treated with any of the well known phosphate processing solutions, or other solutions which properly prepare the surface for painting. If it is desired to treat the metal locally, the following specific formula has been found to be very successful for this purpose.

| | Per cent |
|---|---|
| 75% phosphoric acid | 2.47 |
| Zinc dihydrogen phosphate | 2.8 |
| Chromic acid | 1.0 |
| Duponol WA paste wetting agent | .4 |

The material is simply applied where required and either allowed to air dry or is forced dried, and paint may then be applied without any further operation.

If desired, local application to the injured areas may be made of solutions according to the present invention containing pentavalent arsenic and hexavalent chromium. Mixtures of phosphoric acid and chromic acid, or dichromates, such as described in the rinse operation above, may also be employed with success, the main requirement being that the weakened areas be strengthened by any suitable method so that uniform paint adherence is obtained. The term "paint" is used herein to cover broadly siccative coats, including those commonly referred to as varnish, lacquer and enamel, as well as the coating materials always referred to as paints.

Having described the general principle of the invention and a number of specific applications of these principles, it will be understood that other specific applications of the general principles may be made within the scope of the appended claims.

I claim:

1. A method which comprises applying to a metal surface an acid solution containing as essential ingredients hexavalent chromium and pentavalent arsenic, and forming a glassy coating by drying a film of the solution upon said surface.

2. A method comprising treating a metal surface to make it wet more readily, thereafter applying to the surface a solution containing as essential ingredients hexavalent chromium and pentavalent arsenic, and drying to a non-hygroscopic condition a film of the solution on the surface.

3. A method which comprises treating a metal surface with a solution capable of forming thereon a coating containing a metal other than that of the surface, and applying to the coated surface a solution containing as essential ingredients hexavalent chromium and pentavalent arsenic, and drying a film of said solution upon the surface.

4. A method which comprises treating a metal surface with a solution capable of forming thereon an anti-corrosive coating containing a metal other than that of the surface, and applying to the coated surface a solution containing as essential ingredients hexavalent chromium and pentavalent arsenic, and drying a film of said solution upon the surface.

5. A method which comprises treating a metal with an acid solution containing arsenic, and thereafter treating the surface with a solution containing as essential ingredients hexavalent chromium and pentavalent arsenic, and drying a film of the last said coating upon the surface.

6. A method which comprises applying to a metal surface a solution containing as essential ingredients hexavalent chromium and pentavalent arsenic, and baking a film of the solution on said surface until said film becomes substantially non-hygroscopic.

7. A method of treating a ferrous metal surface which comprises applying to the metal surface a solution containing as essential ingredients hexavalent chromium and pentavalent arsenic, and drying a film of the solution upon said surface.

8. A method of treating a ferrous metal surface comprising a treating the surface to make it wet more readily, thereafter applying to the surface a solution containing as essential ingredients hexavalent chromium and pentavalent arsenic, and drying a film of the solution on the surface.

9. A method of treating a ferrous metal surface which comprises treating the metal with a solution capable of forming thereon a coating containing a metal other than that of the surface, and applying to the coated surface a solution containing as essential ingredients hexavalent chromium and pentavalent arsenic, and drying a film of said solution upon the surface.

10. A method of treating a ferrous metal surface which comprises treating the metal with a solution capable of forming thereon an anti-corrosive coating containing a metal other than that of the surface, and applying to the coated surface a solution containing as essential ingredients hexavalent chromium and pentavalent arsenic, and drying a film of said solution upon the surface.

11. A method of treating a ferrous metal surface which comprises treating the surface with an acid solution containing arsenic, and thereafter treating the surface with a solution containing as essential ingredients hexavalent chromium and pentavalent arsenic, and drying a film of the last said coating upon the surface.

12. A process as described in claim 11, in which the second treatment is with a solution of hexavalent chromium.

13. A method of treating a ferrous metal surface which comprises applying to the surface a solution containing as essential ingredients hexavalent chromium and pentavalent arsenic, and baking a film of the solution on said surface until said film becomes substantially non-hygroscopic.

14. A method which comprises applying to the surface of a ferrous sheet a solution containing as essential ingredients pentavalent arsenic and hexavalent chromium, drying a film of the solution onto the surface, thereafter temper-rolling the sheet, fabricating the temper-rolled sheet into an article, and painting the article.

15. A method which comprises applying to the surface of a ferrous sheet a solution containing as essential ingredients pentavalent arsenic and hexavalent chromium, drying a film of the solution onto the surface, fabricating the sheet into an article, cleaning the article, rinsing the cleaned article in a solution containing acid of the group consisting of chromic acid and phosphoric acid, and thereafter painting the article.

16. A method which comprises applying to the surface of a ferrous sheet a solution containing as essential ingredients pentavalent arsenic and hexavalent chromium, drying a film of the solution onto the surface, fabricating the sheet into an article, touching up spots where the fabrication removes the dried film from the surface, employing in such touching up a solution that chemically improves the paint-holding characteristics of the surface, and thereafter painting the article.

17. An article of manufacture consisting of a metal article having on the surface thereof a dried film of a solution comprising as essential ingredients hexavalent chromium and pentavalent arsenic.

18. An article of manufacture having a metal surface covered with a non-hygroscopic coat formed by drying thereon a film of a solution containing as essential ingredients hexavalent chromium and pentavalent arsenic, the coating being rendered adherent to the metal by chemical reaction.

19. An article of manufacture comprising a weldable ferrous surface covered with a coating of a dried solution containing as essential ingredients hexavalent chromium and pentavalent arsenic.

20. An article of manufacture comprising a ferrous surface having thereon a corrosive-resistant coating covered with a dried film produced by drying a solution containing as essential ingredients hexavalent chromium and pentavalent arsenic.

21. An article of manufacture having a ferrous surface covered with a non-hygroscopic coat formed by baking thereon a solution containing as essential ingredients hexavalent chromium and pentavalent arsenic.

22. An article of manufacture having a ferrous surface covered with a non-hygroscopic coat formed by baking thereon a film of a solution containing as essential ingredients hexavalent chromium and pentavalent arsenic, said coat being of a glassy nature and having more adhesion to metal than cohesion.

23. An article of manufacture having a ferrous surface covered first with an anti-corrosive coating which in turn is covered by a non-hygroscopic coating formed by baking thereon a solution containing as essential ingredients hexavalent chromium and pentavalent arsenic.

24. An article of manufacture having a ferrous surface covered by a substantially integral chemically formed first coat and having the first coat covered with a second coat formed by baking thereon a solution containing as essential ingredients hexavalent chromium and pentavalent arsenic.

25. An article of manufacture having a metal surface covered by a dried film of a solution containing as essential ingredients hexavalent chromium and pentavalent arsenic, and said film being covered in turn by paint.

26. An article of manufacture having a ferrous surface covered by a substantially integral chemically formed first coat, having the first coat covered by a second coat formed by baking thereon a solution containing as essential ingredients hexavalent chromium and pentavalent arsenic, and having dried on the second coat a third coat of paint.

ROBERT R. TANNER.